(12) United States Patent
Bonfiglio et al.

(10) Patent No.: US 11,441,539 B2
(45) Date of Patent: Sep. 13, 2022

(54) METHOD AND SYSTEM FOR CONTROLLING NON-INERTIAL GENERATORS, IN PARTICULAR WIND GENERATORS, BY INERTIA EMULATION

(71) Applicant: Università degli Studi di Genova, Genoa (IT)

(72) Inventors: Andrea Bonfiglio, Genoa (IT); Alessandro Giuseppe Labella, Genoa (IT); Renato Procopio, Genoa (IT)

( * ) Notice: Subject to any disclaimer, the term of this patent is extended or adjusted under 35 U.S.C. 154(b) by 0 days.

(21) Appl. No.: 17/265,782

(22) PCT Filed: Aug. 6, 2019

(86) PCT No.: PCT/IB2019/056686
§ 371 (c)(1),
(2) Date: Feb. 3, 2021

(87) PCT Pub. No.: WO2020/031085
PCT Pub. Date: Feb. 13, 2020

(65) Prior Publication Data
US 2021/0164442 A1    Jun. 3, 2021

(30) Foreign Application Priority Data
Aug. 7, 2018 (IT) .................. 102018000007930

(51) Int. Cl.
F03D 7/00    (2006.01)
F03D 7/02    (2006.01)

(52) U.S. Cl.
CPC ........ F03D 7/0284 (2013.01); H02J 2300/28 (2020.01)

(58) Field of Classification Search
CPC ........ H02J 3/381; H02J 2300/28; H02J 3/241; F03D 7/0284; F05B 2270/327; F05B 2270/337; Y02E 10/76; Y02E 10/72
See application file for complete search history.

(56) References Cited

U.S. PATENT DOCUMENTS

| | | | |
|---|---|---|---|
| 2015/0084338 A1* | 3/2015 | Tarnowski | F03D 7/0276 290/44 |
| 2016/0040653 A1* | 2/2016 | Kang | F03D 9/255 290/44 |

\* cited by examiner

Primary Examiner — Julio G. Gonzalez
(74) Attorney, Agent, or Firm — Themis Law (57) ABSTRACT

A method of controlling, by inertia emulation, electric power generators provided with rotational inertia and connected to the electricity grid with electric power converters includes the steps of measuring grid frequency and/or frequency over-time variation over a rated frequency value; providing a threshold value for, and comparing, the grid frequency or frequency over-time variation; and converting part of the kinetic energy of the generator rotor into electric power to provide additional supporting power to the variation of the grid frequency, wherein the additional supporting power is calculated as a function of the frequency and/or the frequency over-time variation and of a predetermined variable inertia coefficient, the additional power is supplied until the grid frequency variation is restored, and/or the injected power has fallen below a preset limit value, and the coefficient of inertia is calculated by emulating the inertial behavior of synchronous machines, and as a function of rotation velocity.

11 Claims, 5 Drawing Sheets

METHOD AND SYSTEM FOR CONTROLLING NON-INERTIAL GENERATORS, IN PARTICULAR WIND GENERATORS, BY INERTIA EMULATION

FIELD OF THE INVENTION

The present invention concerns a method and system for controlling electric generators provided with rotational inertia connected to the electricity grid by means of electric power converters, in particular of wind generators, by inertia emulation.

With regard to the present description, to the claims and to the exemplary embodiments relative to the figures, the term wind refers to a wind generator, i.e., operated by the wind and which rotates an electric generator, without intending to limit the term wind generator to the specific wind type, by intending to define all generators provided of rotational inertia and connected to the electricity grid by means of electric power converters that release the coupling between the kinetic energy and the electric power of the grid with said term.

A similar consideration and definition are also valid for the term aerogenerator.

The terminological reference to wind generators and aerogenerators considers the fact that these are currently the most frequent types used by the technologies described, but does not constitute a use limitation thereof, which the present invention intends to cover throughout its scope.

BACKGROUND OF THE INVENTION

The progressive increase of the renewable generation connected to the electric system is progressively reducing the so-named inertia seen from the grid which allows to limit the frequency transients in view of generation variations, i.e., of the electric load of the system. This aspect is particularly important for the operation of the electric system since excessively low values of inertial generation connected to the electric system can determine the increase of the rate of change of frequency (Anglo-Saxon acronym RoCoF), a dangerous phenomenon which can cause the opening of protection systems of the generation units and trigger chain phenomena with negative consequences on the electric system and on its stability and reliability.

In order to mitigate this phenomenon, it is necessary to make the renewable generation active with respect to the frequency transients in order to support the grid frequency transients and this can be achieved by using auxiliary control systems.

Auxiliary control systems are known in the state of the art.

A more widespread approach in literature consists in using controllers which emulate the inertial behavior of traditional generators, in order to transiently support the frequency and to increase the overall inertia of the electric system. However, the solutions that were developed are based on an approach defined as Hidden Inertia Emulation (HIE). These solutions emulate an inertial response by hypothesizing an inertia named "synthetic" provided by the wind system. However, this structure has a series of application problems which can lead to instable behaviors of the aerogenerator and, consequently, to an unexpected and damaging arrest of the generation system. An example of a method according to the aforesaid criteria is comprised in the document US2016/0040653 which refers to a control coefficient also defined in relation to an inertia constant [H]. Thus, the control coefficient is based on a fixed value of the inertia constant.

Generally, the solutions described above draw the energy needed to increase the electric power supplied by the generator to an extent correlated to the greater power needed to support and stabilize a frequency variation in the electricity grid. The withdrawal of kinetic energy determines a slowing down of the wind generator rotor and thus a deviation of the working point from the optimal one, in which the generator produces the maximum possible power for the corresponding wind conditions. The withdrawal of kinetic energy is controlled depending on the frequency variations in the electricity grid by changing the parameter of reference of the electric power supplied by the converter.

Such operation causes an inertial decoupling of the wind generator from the grid which is re-established through an inertial emulation process which provides to vary the power that can be withdrawn from the aerogenerator depending on the grid frequency variation due to power imbalances.

According to a further aspect, the problem of managing the speed recovery is not addressed in scientific literature, i.e., the fact that if the wind generator has given a frequency support contribution, during which it gave up part of its kinetic energy to the grid and thus had to slow down with respect to the optimal working speed, once the frequency supporting step has been completed, the aerogenerator must recover the optimal working point, and part of the wind power will be given to the grid, while the remaining one will contribute to accelerating the turbine, by restoring the working point at which it generates the maximum power correspondingly to the wind conditions. In some cases, it is also provided to withdraw a part of the energy necessary to restore the optimal working conditions from the grid.

This step can cause a secondary frequency drop which constitutes a dangerous event for the grid.

In the light of the fact that no one has yet thought about the problem of managing the speed recovery, no logic for effectively managing the transition between the various steps for controlling the frequency support are currently defined in the state of the art.

SUMMARY OF THE INVENTION

The invention thus concerns a method for controlling electric power generators provided with rotational inertia and connected to the electricity grid by means of electric power converters by inertia emulation, which system provides the steps of:

measuring the grid frequency and/or the frequency over-time variation with respect to a rated frequency value of the electricity grid the output of the generator power signal is connected to;

providing a threshold value for said grid frequency or said over-time variation of the grid frequency;

comparing the measured grid frequency and/or the over-time variation of the grid frequency with the corresponding threshold values;

converting a part of the kinetic energy of the generator rotor into electric power, by decreasing the rotation velocity of the generator rotor to such an extent as to provide additional supporting power of the variation of the grid frequency whereby the total power supplied by the generator is greater than the maximum actual power corresponding to the wind conditions, the additional supporting power of the frequency being calculated as a function of the frequency and/or the over-time variation of the grid frequency and of a predetermined variable coefficient of inertia of the generator, and which additional power is supplied until the rated frequency of the grid is restored or until being close to said frequency within a range of preset tolerances, and/or at least until the frequency over-time variation has been reduced within preset limits or said variation is removed, and/or the injected power has fallen below a presettable limit value, and the coefficient of inertia is calculated by emulating the inertial behavior of generators consisting of synchronous machines.

According to the present invention, the available inertia coefficient of the generator is calculated depending on the rotation velocity of the generator rotor.

Unlike that which is provided in the state of the art, among which the method comprised in the document US2016/0040653 can be included, the synthetic inertia coefficient according to the present invention is not a constant value, but adapts itself to the rotation velocity of the aerogenerator.

In particular, such coefficient will be maximum at the start of the step of supporting the grid frequency variation transient period and will progressively decrease at the slowing down of the aerogenerator.

Due to the aforesaid characteristic, it is possible to exploit to the maximum the supporting potential in the first transient steps, when the velocity and thus the rotational kinetic energy of the generator are greater, because the turbine still has not begun to decelerate, thus avoiding possible stalling conditions for the aerogenerator when the velocity decreases. In fact, by determining the amount of additional supporting power to the grid by using a constant value of the inertia of the wind system, there is a risk that the withdrawal of kinetic energy is maintained constant regardless of the value still stored up in the wind system, thus causing a slow down beyond the minimum rotational velocity, thus causing the stalling of the aerogenerator and a worsening of the stabilizing capacity of the electricity grid.

As far as the preset injectable power limit value is concerned, such value can be empirically defined on the basis of experimental data or, as will be described below, calculated on the basis of the effective working conditions of the system.

According to an embodiment, the method provides that, in the grid frequency supporting step, the total power supplied by the generator consists of the sum of the maximum actual power corresponding to the wind conditions, determined on the basis of a so-named MPPT (maximum power point tracking) control and of the additional supporting power calculated on the basis of the following equation:

$$P_{FS} = 2H_{synt}(\omega_r) f_e \frac{df_e}{dt} \quad (1)$$

wherein:

$$H_{synt}(\omega_r) = H_{max}\left[1 + \frac{\omega_r - \omega_{r0}}{\omega_{r0} - \omega_{r,min}}\right] \quad (2)$$

and
$f_e$ is the frequency of the system expressed in p.u.;
t is the time;
$\omega_{r,min}$ is the minimum value of the rotor velocity in p.u.;

$\omega_{r0}$ is the value of the rotation velocity in p.u. of the generator rotor (turbine) at the beginning of the frequency supporting step;
$\omega_r$ is the value of the rotation velocity of the rotor in p.u.;
$H_{synt}$ is the coefficient of synthetic inertia in seconds, i.e., the coefficient of inertia emulating that of the synchronous machines;
$H_{max}$ is the maximum value of the coefficient of inertia calculated for the rotation velocity of the maximum actual power corresponding to the wind conditions at the beginning of the supporting step of the grid frequency.

Still according to a further embodiment of the method, the minimum value $\omega_{r,min}$ of the rotation velocity is selected greater by a preset amount with respect to the rotation velocity corresponding to the cut-off of the turbine (variable depending on the constructive model of the aerogenerator), in order to prevent a minimum threshold of rotation velocity from being exceeded, its overrun causing the turbine, i.e., the rotor, to be stopped.

Thanks to this characteristic, it is always possible to ensure operating stability by avoiding the problem related to the disconnection of the aerogenerator.

Still according to an embodiment, the method provides to establish an activation threshold of the supporting step of the grid frequency variation, the activation threshold providing a maximum negative value of the time derivative of the frequency in accordance with the following condition:

$$\frac{df_e}{dt} \leq ROCOF_{act} < 0 \quad (3)$$

wherein $$\frac{df_e}{dt}$$

is the time derivative of the grid frequency;
$ROCOF_{act}$ is the threshold value.

Still according to a further characteristic, the method provides to disable the supporting step of the grid frequency based on the occurrence of at least one or both of the following conditions:

the frequency over-time variation returned above a preset deactivation threshold value ($RoCoF_d$);

the overall power produced during the frequency supporting step drops below the MPPT power generated, i.e., the maximum actual power corresponding to the wind conditions upon the activation of the supporting step.

This last condition indicates that the power necessary for supporting the frequency is less than the maximum one made available by the wind and it is thus possible to avoid keeping the frequency supporting process still active.

The aforesaid two conditions can be specifically described by the following equation:

$$\frac{df_e}{dt} > RoCoF_{deact} \cup P_{s,ref} < P_{MPPT0} \quad (4)$$

wherein
$RoCoF_{deact}$ is the deactivation threshold value of time derivative of the grid frequency;

$$\frac{df_e}{dt}$$

is the time derivative of the grid frequency;

$P_{s,ref}$ is the power reference value, specifically when the frequency support is in progress;

$P_{MPPT0}$ is the maximum power value made available by the wind conditions.

According to an embodiment, the present invention concerns a method of controlling electric power generators by inertia emulation, which system provides the steps of:

measuring the grid frequency or the over-time variation of the frequency with respect to a rated frequency value of the electricity the output of the generator power signal is connected to;

providing a threshold value for said grid frequency or said over-time variation of the grid frequency;

comparing the measured grid frequency or the over-time variation of the grid frequency with the corresponding threshold values;

converting a part of the kinetic energy of the generator rotor into electric power, by decreasing the rotation velocity of the generator rotor to such an extent as to provide additional supporting power of the variation of the grid frequency whereby the total power supplied by the generator is greater than the maximum actual power corresponding to the wind conditions, the additional supporting power being calculated as a function of the frequency and/or the over-time variation of the grid frequency and of a predetermined variable coefficient of inertia of the generator, and which additional power is supplied until the rated frequency variation of the grid is restored or until being close to said frequency within a range of preset tolerances and/or at least until the frequency over-time variation has been reduced within preset limits or said variation is removed, and/or the injected power has fallen below a presettable limit value, and the coefficient of inertia is calculated by emulating the inertial behavior of generators consisting of synchronous machines and wherein at the end of the grid frequency supporting step, a restoring step is provided to restore the delivery condition of the optimum maximum power corresponding to the wind conditions in which the generator, i.e., the rotor or turbine, are accelerated to a rotation velocity corresponding to the generation of said optimum maximum power value.

According to the invention, the method provides the further steps of estimating the actual available wind power;

defining a time path for recovering the rotor rotation velocity by minimizing the temporary reduction in the grid frequency (secondary frequency drop) due to a sudden reduction in the power injected into the grid so as to accelerate the turbine corresponding to the increase in velocity needed to restore the condition of delivering the maximum optimal power corresponding to the wind conditions.

According to an embodiment of the aforesaid method, the invention provides to set the acceleration of the rotor/turbine of the generator from the speed at the end of the grid frequency supporting step to the rotation velocity corresponding to the generation of the maximum optimum power for the corresponding wind condition to the extent that the generator power, for each rotation velocity at an intermediate value, is between a maximum value corresponding to the wind power and a minimum value corresponding to the characteristic curve describing the maximum power locus as a function of the wind speed.

According to an embodiment, such intermediate value is defined according to the following equation $$P_{SR}=K_{SR}[P_{MPPT}(\omega_r)-P_s-2H_{WTG}\omega_r\alpha_r] \quad (5)$$

wherein $P_{SR}$ is the power contribution for the recovery of the kinetic energy of the generator;

$P_{MPPT}(\omega_r)$ is the maximum optimum power corresponding to a given rotation velocity $\omega_r$ of the rotor determined by means of the maximum power point tracking method;

$P_s$ is the electric power produced by the generator;

$H_{WTG}$ is the inertia coefficient of the rotor of the wind generator comprising the inertia of the generator;

$K_{SR}$ is a regulating parameter of the intermediate positioning measurement of the reference power of the converter between a maximum value corresponding to the wind power and a minimum value corresponding to the characteristic curve describing the maximum power locus depending on the wind speed.

According to an embodiment, the aforesaid parameter $K_{SR}$ is defined by the following equation:

$$K_{SR}(f_e) = 0.9\left(1 - \frac{f_e - f_{min}}{f_{max} - f_{min}}\right) \quad (6)$$

wherein $f_e$ is the grid frequency expressed in p.u.;

$f_{max}$ is a maximum frequency parameter expressed in p.u. defined based on the application to a specific grid;

$f_{min}$ is a minimum frequency parameter expressed in p.u. defined based on the application to a specific grid and to the characteristics of this grid.

As will become clearer in the following description of a detailed example, with regard to the step of recovering the speed of the generator, i.e., of the rotor/turbine, at the end of a grid frequency supporting step, the aforesaid embodiments are based on the principle of supplying a power reference that is a compromise between having a speedy recovery that is burdensome for the grid frequency, for example a recovery directly on the MPPT curve, and a very slow recovery with respect to the one achievable by moving on the characteristic curve that describes the place of the maximum power locus depending on the speed of the wind, which would not always be necessary. To do this, it is necessary to be in an intermediate zone between the power supplied by the wind and the MPPT curve.

The embodiments described above and relative to the step of restoring the speed of the generator to return to the optimal maximum power generating condition (MPPT) corresponding to the current wind conditions, can be provided separately from the embodiments of the method described above with reference to the grid frequency supporting step and in combination with any different method respectively for supporting the grid frequency and for restoring the speed of the generator.

Alternatively, the embodiments described above and relative to the step of restoring the speed of the generator to return to the optimal maximum power generating condition (MPPT) corresponding to the wind conditions, can be provided in any combination with one or more of the embodiments of the method described above with reference to the grid frequency supporting step.

With reference to one or more of the preceding embodiments and/or embodiment variants described, it is also possible to provide that, in particular for the step of restoring the optimal rotation velocity of the rotor, at least part of the power necessary for said recovery, i.e., for accelerating the aerogenerator, is withdrawn from the grid itself.

In alternative or in combination with the above, an embodiment can also provide using electric power accumulator from which to withdraw at least part of the energy necessary to restore the optimal speed.

The invention also concerns a system for implementing the aforesaid method according to one or more of the preceding claims, comprising:

at least one generator or wind generator;

a converter for connecting the wind generator to an electricity grid, the converter consisting of a conversion unit that decouples the alternating current dynamics of the grid from the electromechanical dynamics of the aerogenerator with regard to the power injected by the aerogenerator, a control unit of said converter connecting the generator to the grid, the control unit controlling the converter by generating a reference signal of an output power supplied to the grid which corresponds to a maximum optimum output power of the generator for a corresponding wind condition, and the control unit being designed for, or comprising, a detector of the grid frequency and/or the grid frequency over-time variation;

the control unit being designed for, or comprising, a measuring device to measure the speed of the generator rotor or turbine; and a varying section to vary said reference signal upon generation of a generator output power for the generation of an output power signal greater than the generator's maximum optimal output power for a corresponding wind condition as a function of the measured grid frequency and/or the measured frequency variation and a kinetic energy drawn from the generator's rotor and/or turbine which is defined as a function of an inertia value calculated as an emulation of the inertia of a synchronous machine.

According to the present invention, the control unit calculates the emulated inertia value of a synchronous machine as a function of the actual rotation velocity of the generator rotor or turbine and controls the generation of more output power from the generator than the maximum optimum power for the wind condition, the greater power depending on the actual rotation velocity of the generator rotor or turbine.

According to an embodiment, said control unit is configured to store or comprises at least one memory for storing at least one first grid frequency and/or frequency variation value which constitutes an activation threshold of the variation section of the signal of reference;

and is configured to compare or comprises a comparator of the grid frequency and/or frequency variation value measured with said first threshold value, and which control unit activates the variation section of the signal of reference depending on an activation signal supplied by the comparator.

Still according to a characteristic, the control unit is configured to store or comprises a memory in which a second grid frequency and/or frequency variation value is stored and which constitutes a deactivation threshold and is configured to compare or comprises a comparator of the grid frequency and/or frequency variation value measured with said second value of the deactivation threshold, and which control unit disables the variation section of the signal of reference depending on an activation signal supplied by the comparator.

According to an embodiment, the activation and deactivation of the variation of the signal of reference take place accordingly to the criteria described with reference to the method and in particular according to the criteria defined by the equations (3), (4) and (15) which will be described below.

According to an embodiment, said control unit comprises a first generating section to generate a first reference signal for generating an output power of the generator corresponding to the maximum optimum power for the wind condition and an additional generating section to generate a second reference signal for generating an additional power supporting the frequency or supporting the grid frequency, the reference signal being determined as a function of the actual rotation velocity of the generator rotor or turbine, said first and second reference signals being added together in a reference signal supplied to the converter.

According to an embodiment, the converter comprises a couple of static converters of which respectively a converter on the generator side for converting from alternated current to continuous current and a converter on the electricity grid side for converting from continuous current to alternated current and which converters are connected to each other by means of a continuous current link and said control unit supplies the signal of reference to at least the generator side converter.

This last characteristic allows to achieve an additional control unit which allows to modify the existing systems by means of a simple integration, thus also allowing to actuate the method of supporting the grid frequency in existing systems without requiring heavy hardware upgrade interventions.

The invention also concerns a system for implementing the aforesaid method according to one or more of the preceding claims, comprising:

at least one generator or wind generator;

a converter for connecting the wind generator to an electricity grid, the converter consisting of a conversion unit that decouples the alternating current dynamics of the grid from the electromechanical dynamics of the aerogenerator with regard to the power injected by the aerogenerator, a control unit of said converter connecting the generator to the grid, the control unit controlling the converter by generating a reference signal of an output power supplied to the grid which corresponds to a maximum optimum output power of the generator for a corresponding wind condition, and the control unit being designed for, or comprising, a detector of the grid frequency and/or the grid frequency over-time variation;

the control unit being designed for, or comprising, a measuring device to measure the speed of the generator rotor or turbine;

and a varying section to vary said reference signal upon generation of a generator output power for the generation of an output power signal greater than the generator's maximum optimal output power for a corresponding wind condition as a function of the measured grid frequency and/or the measured frequency variation and a kinetic energy drawn from the generator's rotor and/or turbine which is defined as a function of an inertia value calculated as an emulation of the inertia of a synchronous machine.

According to the invention, the control unit is configured to or further comprises A detector of the wind power by means of an estimate based on the static and dynamic parameters of the aerogenerator;

a generator of a reference signal for reducing the electric power supplied by the generator to the grid by an amount corresponding to an acceleration of the aerogenerator to return to the optimum working point, the reference signal depending on the value of the grid frequency between a preset maximum and minimum values of the wind power.

Possibly, it is also possible to hypothesize that part of this acceleration energy of the aerogenerator is withdrawn from the grid itself.

In alternative or in combination, an embodiment can also provide using electric power accumulator from which to withdraw at least part of the energy necessary to restore the optimal speed.

According to an embodiment, the control unit is configured to determine or comprises measuring means to measure the rotation velocity variation of the rotor or turbine and is configured to calculate the wind power depending on said rotation velocity variation.

According to an embodiment, the control unit is configured to store or comprises a memory for storing a maximum frequency value of the grid and a minimum frequency value of the grid.

The invention also concerns an additional control unit for controlling generators, in particular wind ones, for supporting the grid frequency, i.e., for supporting grid frequency variations, by means of variable inertia and/or for managing the rotary speed recovery transient, which control unit comprises at least one interface for measurement signals of rotor rotation velocity;

at least one interface for measurement signals of the grid frequency and/or the over-time variation of said frequency;

at least one section for determining a reference signal of the additional power obtainable from the kinetic energy of a synchronous generator, said control unit being designed to determine, by emulating the inertia of a synchronous machine, said reference signal as a function of said frequency and/or said grid frequency variation and of the actual rotation velocity of the generator rotor, and said additional control unit being provided with an output for said additional power reference value.

According to a further embodiment, said additional control unit is configured to further calculate a signal of reference of the power for the recovery of kinetic energy from the grid depending on the frequency or grid frequency variation and on the rotation velocity variation of the rotor.

According to an embodiment, said control unit comprises at least one interface for setting a first threshold value for activating the generation of the signal of reference corresponding to an additional power to support the grid frequency and a second threshold value for deactivating the signal of reference corresponding to an additional power supporting the grid frequency.

Still according to a characteristic, said control unit comprises a comparator or is configured to compare said threshold values with the grid frequency and/or grid frequency variation value measured and is configured or comprises a generator to generate an activation/deactivation signal of the signal of reference depending on the results of the comparison with said thresholds.

Still according to an embodiment, the control unit comprises or is configured to store at least one maximum value and at least one minimum value for the grid frequency and to determine the wind power, whereas it is configured to calculate a signal of reference for reducing the electric power supplied by the generator to the grid to an extent corresponding to an acceleration of the aerogenerator for returning to the optimal working point, which signal of reference of the power reduction is determined as a function of the minimum frequency, of the maximum frequency and of the effective frequency of the grid and of the wind power.

Possibly, it is also possible to hypothesize that part of this acceleration energy of the aerogenerator is withdrawn from the grid itself.

In alternative or in combination, an embodiment can also provide using electric power accumulator from which to withdraw at least part of the energy necessary to restore the optimal speed.

Further characteristics are objects of the invention.

BRIEF DESCRIPTION OF THE DRAWINGS

The characteristics described above and further characteristics and advantages of the present invention will become clearer in the following description of some embodiment examples shown in the accompanying drawings, in which.

DETAILED DESCRIPTION OF EMBODIMENTS OF THE INVENTION

Figure 1:
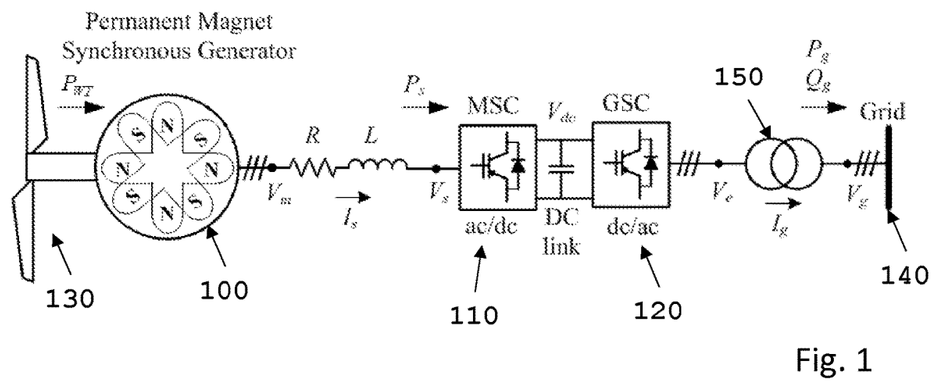
FIG. 1 shows a general scheme of a wind generator of the latest generation.

The traditional structure of a wind generator comprises a permanent magnet synchronous generator (not limitedly, it is possible to provide other types) 100 and the connection with the electricity grid by means of two static converters, the machine side converter 110 (MSC) and the grid side converter 120 (GSC) as schematically shown in FIG. 1.

The kinetic energy of the wind, i.e., the wind power, is initially transformed into kinetic energy of the rotor activated by the blades, i.e., of the turbine 130, i.e., the power of the rotor denoted by $P_{wt}$. The output power of the electric generator from the electric generator 100 and denoted by $P_s$ is converted by the converters 110 and 120 and supplied to the grid schematically denoted by 140. In the example, this occurs by means of an insulated coupling, in particular a coupling transformer 150, but such type of coupling is not essential.

The figure shows the electrical parameters that have an important role in the process of generating and supplying the electric power generated to the grid 140.

In particular, the aforesaid parameters are defined here below

Vm=output voltage from the permanent magnet synchronous generator 100

R=supply line resistance of the electric power signal $P_s$ to the generator side MSC converter 110;

L=supply line inductance of the electric power signal $P_s$ to the generator side MSC converter 110;

Is=stator current of the permanent magnet synchronous generator in the supply line of the electric power signal $P_s$ to the generator side MSC converter 110;

Vs=signal voltage of the permanent magnet synchronous generator at the end of the supply line of the electric power signal $P_s$ to the generator side MSC converter 110;

Ps=stator power of the permanent magnet synchronous generator 100 at the end of the supply line of the electric power signal $P_s$ to the generator side MSC converter 110;

MSC=Electronic machine side converter 110;

$V_{DC}$=DC link output voltage from the MSC and entering the GSC;

GSC=Electronic electricity grid side converter 120;

Ve=output voltage from the GSC 120;

Ig=current in the grid side 140 AV connection;

Vg=grid voltage 140;

Pg=Active power injected in the grid;

Qg=Reactive power injected in the grid;

The dynamic of the rotor of the aerogenerator can be described by the following relation (in p.u. on the basic dimensions of the aerogenerator):

$$P_w(v_w, \omega_r, \beta) - P_s = 2H_{WTG}\omega_r \frac{d\omega_r}{dt} \quad (7)$$

wherein $H_{WTG}$ is the inertia of the rotor, i.e., of the turbine 130 of the aerogenerator, including the inertia of the synchronous generator 100, $P_s$ is the active stator power, $P_w$ is the power extracted from the wind, $v_w$ is the wind speed in m/s, $\beta$ is the pitch angle of the rotor blades in degrees and $\omega_r$ is the rotor velocity in p.u. The electric power produced by the electric generator $P_s$ is controlled by acting on the generator side 100 MSC controller 110 by using a control scheme that provides the quadrature axis current reference $i_{sq,ref}$ to the inner current controller of the MSC 100.

The solution described above is to be considered an example among multiple alternative solutions included in the basic technical-cultural background of the expert of the field from which he can choose.

Figure 2:
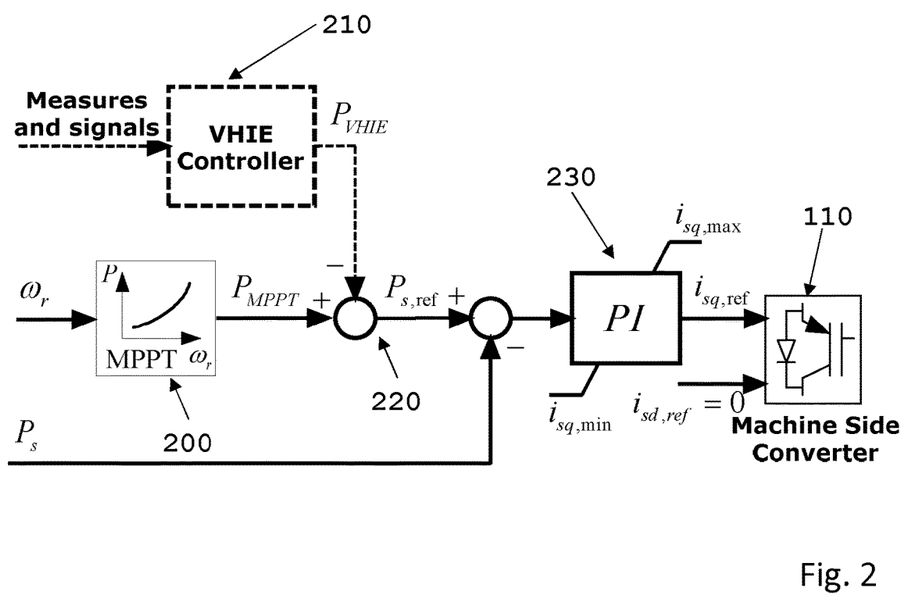
FIG. 2 shows an exemplary embodiment of a traditional control structure of an aerogenerator with a dotted addition of the integrative control unit according to the present invention.

FIG. 2 shows a control unit according to an embodiment of the present invention.

The control unit comprises a first section 200 which determines a power signal reference denoted by $P_{MPPT}$ and which is determined by calculating the optimal maximum power of the generator corresponding to the wind conditions to which it is subjected. The technique named MPPT (Maximum Power Point Tracking) is a technique known in the state of the art. The calculation section 200 and thus the generation of the first signal of reference $P_{MTTP}$ in turn receives the measurement signal of the rotation velocity of the rotor, i.e., of the turbine 130 as shown with the arrow $\omega_r$.

The control unit comprises a further section 210 for determining an additional signal of reference $P_{VHIE}$.

This additional signal of reference is generated depending on the detection of a grid frequency variation and, as will be clear below, in turn has two generators of two different additional power reference signals, respectively $P_{FS}$ and $P_{SR}$, never present contemporaneously. The first additional signal of reference $P_{FS}$ controls the converter MSC 110 so that to provide greater electric power to the grid than to that obtained by the signal of reference relative to the optimal maximum power $P_{MPPT}$ at the expense of the kinetic energy of the turbine 130, which thus suffers a slow-down.

The second signal of reference $P_{SR}$ drives the controller 110 MSC so that the power supplied corresponds to a recovery of energy to an extent such as to re-establish the rotation velocity of the turbine 130 corresponding to the one relative to the optimal maximum power with reference to the wind conditions.

The management of the two control steps of the converter 110 MSC for supporting the grid frequency, at the expense of the kinetic energy stored up in the turbine and to restore the optimal dynamic conditions of the turbine, i.e., to accelerate it to the rotation velocity corresponding to the optimal maximum power with respect to the wind conditions, will be described in more detail below with reference to an exemplary embodiment.

The process of determining the additional signals of reference $P_{FS}$ and $P_{SR}$ will also be described in more detail.

It should be noted that the section 210 provides the output signals $P_{FS}$ and $P_{SR}$ or a signal with null value when there is no need to support the frequency or to restore the rotation velocity of the aerogenerator.

The signals of reference $P_{MPPT}$ and $P_{FS}$, $P_{SR}$, generated by the two sections 200 and 210, are added together as shown by the functional block 220 and are thus supplied to a Regulator of the saturated proportional-integral type 230, whose output is limited to a field ranging from a maximum value to a minimum value respectively denoted by $i_{sq,max}$ and $i_{sq,min}$.

The solution described above is to be considered an example among multiple alternative solutions included in the basic technical-cultural background of the expert of the field from which he can choose.

The output signal $i_{sq,ref}$ from the proportional-integral regulator 230 is supplied as a control signal to the converter MSC 110 which correspondingly generates an output voltage $V_{DC}$ in the connecting link connected to the grid side 140 converter 120.

The parameters and amounts denoted in FIG. 2 are defined in detail below.

$V_{HIE}$=Acronym of the controller suggested (Variable Hidden Inertia Emulator)

$P_{VHIE}$=Emulation signal power of the inertial response of the wind system 130;

$P_{MPPT}$=Power reference obtained from the maximum power point tracking or maximum power point;

$P_{s,ref}$=power reference of the signal supplied to the converter MSC 110

$i_{sq,max}$=maximum value of the quadrature axis current which the current controller of the converter MSC 110 can request $i_{sq,min}$=minimum value of the quadrature axis current which the current controller of the converter MSC can request $i_{sd,ref}$=direct axis current reference requested by the controller to the converter MSC 110;

$i_{sq,ref}$=quadrature axis current reference requested by the controller to the converter MSC 110;

PI=Regulator of the proportional-integral type 230.

Figure 3:
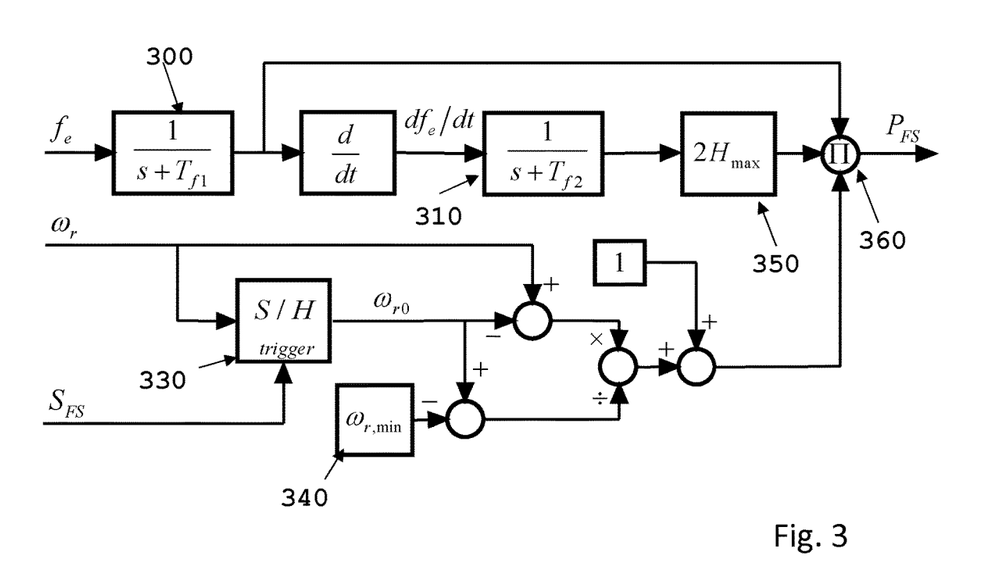
FIG. 3 shows a functional scheme of the frequency supporting step for an exemplary embodiment of the control unit according to the present invention.

With reference to FIG. 3, this shows a functional scheme of an exemplary embodiment relative to the grid frequency supporting step for the integrative controller VHIE 210.

The starting point of the controller suggested is the traditional structure of controllers that emulate the inertial behavior of synchronous machines, wherein the additional power signal for the frequency supporting step is defined as:

$$P_{synt} = 2H_{synt}f_e \frac{df_e}{dt} \tag{8}$$

wherein $H_{synt}$ is the synthetic inertia coefficient in seconds, whereas $f_e$ is the frequency of the system expressed in p.u. and $P_{synt}$ is the additional power signal for the frequency supporting step.

As highlighted in literature, this approach has practical operative limits since high values of the parameter $H_{synt}$ can cause unstable phenomena in the aerogenerator which can cause the disconnection from the grid (very damaging circumstance when needing a frequency supporting action). Instead, the present invention is based on the concept that the coefficient $H_{synt}$ is not maintained constant throughout the supporting action and that it can be varied, and in particular reduced, at the decreasing of the rotor velocity of the aerogenerator.

The logic that is suggested is thus that the value of $H_{synt}$ is maximum when the frequency transient starts, i.e., grid frequency variation, and that it decreases until vanishing for a given minimum value of the rotor velocity $\omega_{r,min}$. If this minimum value is chosen sufficiently greater than the rotation velocity corresponding to the cut-off of the turbine 130, it is always possible to ensure the operating stability of the aerogenerator, thus avoiding the problem of its disconnection from the grid. The coefficient intended to be considered for the frequency supporting step will thus be defined as:

$$H_{synt}(\omega_r) = H_{max}\left[1 + \frac{\omega_r - \omega_{r0}}{\omega_{r0} - \omega_{r,min}}\right] \tag{9}$$

wherein $\omega_{r,min}$ is the minimum value of the rotor velocity in p.u.;

$\omega_{r0}$ is the value of the rotation velocity of the generator rotor (turbine) in p.u. at the start of the frequency supporting step;

$\omega_r$ is the value of the rotation velocity of the rotor in p.u.;

$H_{synt}$ is the coefficient of synthetic inertia in seconds, i.e., the coefficient of inertia emulating that of the synchronous machines;

$H_{max}$ is the maximum value of the coefficient of inertia calculated for the rotation velocity of the maximum actual power corresponding to the wind conditions at the beginning of the supporting step of the grid frequency.

In order to implement the relation (9) above, the need to track the rotation velocity of the rotor/turbine at the start of the frequency supporting step, $\omega_{r0}$, is clear. This can easily be obtained by using a simple Sample and Hold (holding of the first order) activated by the activation signal of the frequency supporting step $S_{FS}$.

Considering (8) and (9), it is possible to calculate the power contribution associated to the frequency supporting step $P_{FS}$ as:

$$P_{FS} = 2H_{synt}(\omega_r)f_e\frac{df_e}{dt}. \tag{10}$$

In order to consider an effective implementation of the structure suggested, it is possible to introduce two filtering elements for measuring the frequency and for deriving it. The functional scheme for the part relative to the frequency support of the integrative controller suggested is depicted in FIG. 3.

The filters mentioned above for measuring the frequency and for deriving it are denoted by 300 and 310. The sample and hold component 330 is to keep track of the rotation velocity of the turbine rotor at the start of the frequency supporting step, $\omega_{r0}$.

The storing elements 340 and 350 provide the data stored for the minimum rotation velocity of the rotor $\omega_{r,min}$ and for the maximum inertia value of the rotor $H_{max}$.

The additional control section has an input port to measure the grid frequency $f_e$ supplied to the first filter 300 and a port for the measurement signal of the effective rotation velocity of the rotor $\omega_r$.

The section provides the output reference signal to the multiplier 360 for the additional grid frequency supporting power, i.e., for the support of said frequency denoted by $P_{FS}$.

Figure 4:
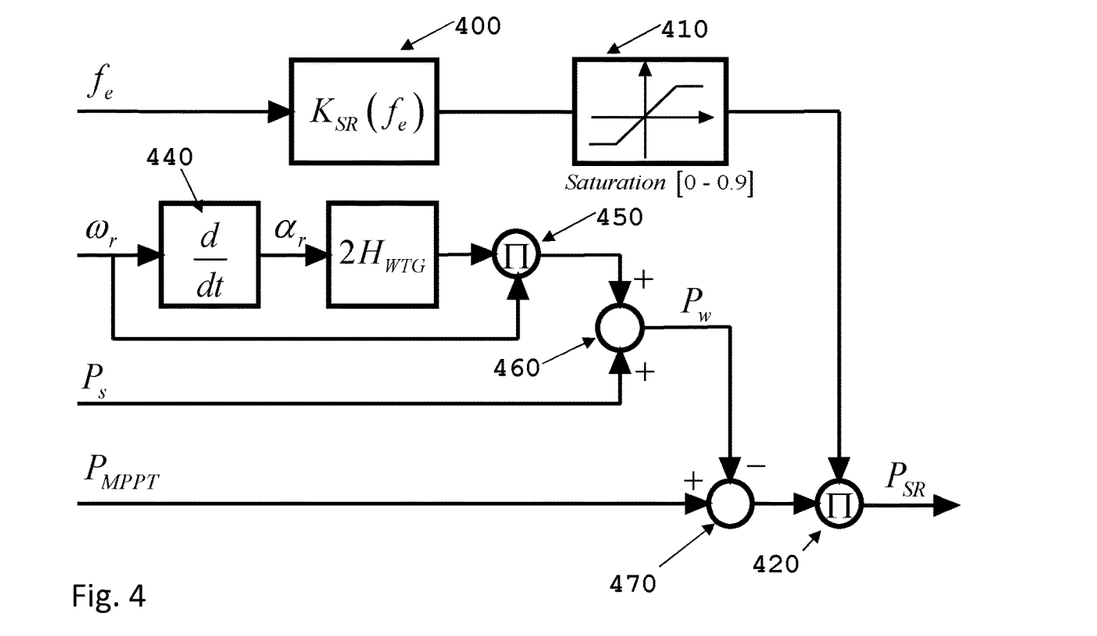
FIG. 4 shows a functional scheme of the part related to the speed recovery for an exemplary embodiment of the control unit according to the present invention.

FIG. 4 shows a functional scheme of the part related to the speed recovery for an exemplary embodiment of the additional control unit according to the present invention.

For the step of recovering the speed of the wind generator, the invention provides a power reference that is a compromise between having a quick speed recovery, although burdensome for the grid frequency $f_e$ by using the power determined based on the MPPT process and denoted by $P_{MPPT}$ as reference, and a very slow recovery which would not always be necessary.

To do this, it is necessary to be in an intermediate zone between the power supplied by the wind and the MPPT curve, which can be analytically translated as follows:

$$P_{SR}=K_{SR}[P_{MPPT}(\omega_r)-P_w(v_w,\omega_r,\beta)] \tag{11}$$

The parameter $K_{SR}$ of (11) must always ideally be between 0 and 1 and represents the regulating parameter for discriminating between a more or less pronounced speed recovery.

A value of $K_{SR}$ close to one will cause a very slow speed recovery transient and is thus little damaging for the frequency transient.

On the contrary, values of $K_{SR}$ close to zero will achieve a quicker speed recovery that is more burdensome for the grid.

According to this consideration, the present invention defines the value of $K_{SR}$ not a priori as a constant amount, but depending on the grid frequency value $f_e$; this way, a high value of $K_{SR}$ will be preferred for low frequency values, whereas a lower value of $K_{SR}$ will instead be preferred for greater frequency values.

At the implementation level, it is advisable not to work at a unitary value of $K_{SR}$ since the estimate of the wind power, covered below, could be affected by uncertainties and using a limit value could cause undesired behaviors of the controller.

In practice, $K_{SR}$ will thus be saturated at the value of 0.9. According to an embodiment, $K_{SR}$ is calculated as:

$$K_{SR}(f_e) = 0.9\left(1 - \frac{f_e - f_{min}}{f_{max} - f_{min}}\right) \tag{12}$$

The $f_{min}$ and $f_{max}$ values will be defined according to the specific application. For frequency values outside the limits considered, $K_{SR}$ will be saturated above 0.9 and below zero.

According to a further aspect, in order to implement (11), there is a need to estimate the power made available by the wind.

This is a key aspect for the proper operation of the control section according to the present invention with regard to the step of recovering the speed of the generator at the expense of the energy injected in the grid, since such extent can not only be directly measured, but can also vary according to the wind variation.

In case of availability of an anemometric system, the wind power can be estimated by using the algebraic relation that defines the wind power $P_W$ depending on the wind speed $v_W$ and to the pitch angle of the blades β. This approach has two applicative problems, the first is that not all aerogenerators have anemometric systems and these are often only used for diagnostic purposes and not for controlling purposes, the second is that the data needed for calculating the power extracted from the wind is not often available that easily.

According to an improvement of the present invention, the determination of the wind power is carried out by only using measures that can be accessed by the control system of the aerogenerator, especially by the control system present according to the embodiments of the known art. According to this improvement, the power available from the wind is estimated by inverting the motion equation, thus obtaining:

$$P_w = P_s + 2H_{WTG}\omega_r\alpha_r \quad (13)$$

wherein $\alpha_r$ is the rotor acceleration of the aerogenerator that can be directly measured or estimated by an angular velocity value $\omega_r$. Thanks to this estimation of the wind power, the controller is resistant against wind variations which can occur during the frequency supporting and/or speed recovering step.

By inserting (13) in (11), it is possible to obtain the final version of the power signal relative to the speed recovery step:

$$P_{SR} = K_{SR}[P_{MPPT}(\omega_r) - P_s - 2H_{WTG}\omega_r\alpha_r] \quad (14)$$

With reference to FIG. 4, the grid frequency measurement $f_e$ is input to a calculation block 400 of the parameter $K_{SR}$ that is configured to carry out the calculation instructions according to the relation (12).

The component 410 applies the saturation factor and provides a signal to the multiplier 420.

The rotation velocity value of the turbine $\omega_r$ is input to a component 440 configured to generate the time derivative of such value and provides an output value for accelerating the turbine $\alpha_r$. This value is provided to a multiplier 450 together with the value relative to the parameter $H_{WTG}$, which is the inertia coefficient of the rotor of the wind generator inclusive of the inertia of the synchronous generator. The sum 460 of the electric power of the generator $P_S$ with the output of the multiplier 450 corresponds to the estimation of the wind power $P_W$ and is in turn subtracted 470 from the optimal maximum power signal of reference for the wind conditions defined according to a process MPPT and denoted by $P_{MPPT}$. Finally, the reference signal $P_{SR}$ is output from the multiplier 420 to the converter 110, to be applied thereto during the step of recovering the speed of the generator.

Figure 7:
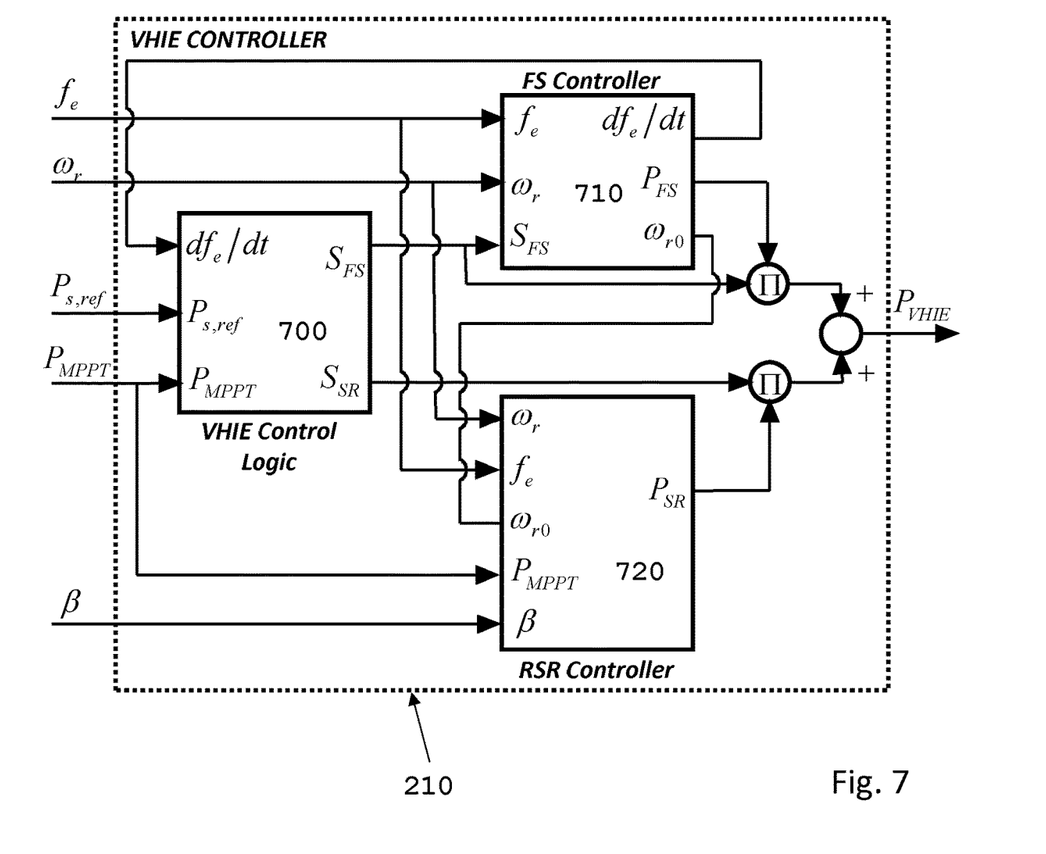
FIG. 7 shows a block diagram of the overall architecture of the control unit according to an exemplary embodiment of the present invention.

FIG. 7 shows an overall scheme of an embodiment of the additional control unit according to the present invention. In this case, the additional control unit 210 has a control logic for generating signals to activate the steps of supporting the grid frequency of the grid and of restoring the rotation velocity of the generator by withdrawing energy from the grid once the supporting step is finished.

The logic control system 700 drives the section 710 for generating the additional reference signal of the converter 110 which operates according to the exemplary embodiments shown above with reference, in particular, to FIG. 3 synchronously with the control section 720 of the additional reference signal provided to the converter during the step of restoring the speed of the generator.

The term synchronized means that the signals provided by the two sections 710 and 720 are made available to the additional control alternatively to one another and never contemporaneously.

Said sections can be made in a hardware configuration, the functions implemented in a fixed way being in the hardware.

An alternative can provide that said sections are at least in part constituted by a generic processing hardware comprising a processor, at least one memory for at least one program and interfaces for the input measurement signals and those for the output reference signals, said program comprising the instructions to carry out the functions of said sections according that which has been previously described and said program configuring the processor and the respective peripheral devices so that to carry out the functions of said sections.

According to an embodiment, the section 700 relative to the control logic of the generators of the additional reference signals for the step of supporting the grid frequency and the step of restoring the rotation velocity of the generator generates, for each of said generators 710 and 720, a control signal that activates and disables in alternative one with respect to the other one or neither of the two said generators 710 and 720 depending on the detected values of the grid frequency and/or variation thereof with respect to time and depending on the rotation velocity of the power contribution of the generator.

Figure 5:
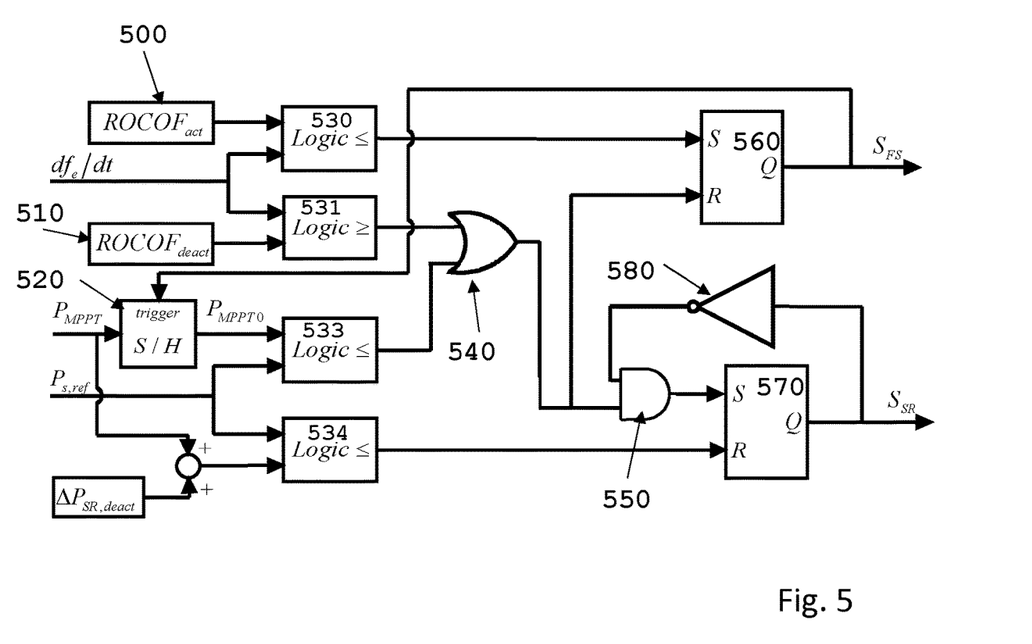
FIG. 5 shows a logic implementation scheme for defining the signals for managing the various operative steps of an exemplary embodiment of the control unit according to the present invention.

FIG. 5 shows an embodiment of the logic of said section 700 of logic control.

The managing logics of the various transient steps are described below, since the support to the grid frequency must last for the time needed to support the frequency and not beyond, so that to avoid causing an excessive slow-down of the rotor which will then be burdensome on the speed recovering step.

With regard to this, the frequency support must be activated by an excessive grid frequency variation translated in exceeding an activation threshold ($RoCoF_{ACT}$) of the frequency derivative:

$$\frac{df_e}{dt} \le ROCOF_{act} < 0 \quad (2)$$

Whenever the condition (2) occurs, a logic activation signal ($S_{FS}$) is switched from 0 to 1 by the frequency supporting step. Such signal must remain equal to one or until there is a need to leave the frequency supporting step and to switch to the speed recovering step.

This can occur following two circumstances, the first is that the frequency variation has returned within non-dangerous values, defining a deactivation threshold $RoCoF_{deact}$, i.e., if the total power produced during the frequency supporting step drops below the power of MPPT, which would indicate that the power injected during the frequency support is less than the one made available by the wind and it is thus possible to avoid keeping the frequency support still active.

These two conditions can be summarized as follows:

$$\frac{df_e}{dt} > RoCoF_{deact} \cup P_{s,ref} < P_{MPPT0}. \quad (3)$$

The need to remember the initial power value defined according to a process of MPPT $P_{MPPT0}$ will imply remembering the power produced by the aerogenerator at the start of the supporting action, but this will be duly taken into consideration when defining the controller.

When one of the two conditions of (3) has occurred, the signal $S_{FS}$ returns to zero while the signal will be activated that marks the speed recovery step $S_{SR}$ will switch from zero to one and will remain as such at the end of the speed recovery step.

The speed recovery step will end when the reference signal produced by the auxiliary control system will not be sufficiently close to the MPPT signal, which is equivalent to imposing the condition:

$$P_{s,ref} \leq P_{MPPT} + \Delta P_{SR,deact} \quad (15)$$

wherein the $\Delta P_{SR,deact}$ parameter represents a tolerance threshold to be appropriately calibrated.

The logic just described for generating signals for managing the various steps of the integrative controller VHIE ($S_{FS}$ and $S_{SR}$) can be easily translated into a logic scheme that uses logic, flip-flop and comparator operators as stated in 5.

The values of the thresholds $RoCoF_{act}$ and $RoCoF_{deact}$ are stored in the memories 500 and 510.

The Sample and Hold component 520 keeps track of the initial power value $P_{MPPT}$ determined with the MPPT process, Also the values relative to the electric power reference signal of the generator $P_{S,Ref}$ and to a tolerance parameter $\Delta P_{SR,deact}$ are input to the logic components of comparison 530, 531, 532, 533.

The logic components 540 OR, 550 AND and the flip-flops 560 and 570 output, synchronously between each other, the activation signals $S_{FS}$ and $S_{SR}$ of the generators 710 and 720, respectively of the additional reference signal $P_{FS}$ and $P_{SR}$ to be provided to the converter 110 MSC together with the reference relative to the optimal maximum signal for the wind condition $P_{MPPT}$, during the respective steps of supporting the frequency grid for restoring the speed of the generator.

As is clear in the functional scheme of FIG. 5, the activation signal $S_{SR}$ of the generator speed recovery step has a feedback to the logic component 580 AND through a logic component 550 NOT.

According to that which is described, the additional contribution provided by the additional control unit 210 VHIE represented in FIG. 2 can be defined as:

$$P_{VHIE} = P_{FS} \cdot S_{FS} + P_{SR} \cdot S_{SR} \quad (16)$$

wherein $P_{FS}$ and $P_{SR}$ represent the additional contributions to the power reference signal provided to the converter 110 during the steps of supporting the frequency and speed recovery, respectively.

The contribution of said additional control unit 210 object of the present invention will be added to the MPPT ($P_{MPPT}$) reference which allows the aerogenerator to produce the maximum power extractable from the wind by modifying de facto the reference provided to the controller of the converter 110 MSC denoted $P_{s,ref}$.

Figure 6:
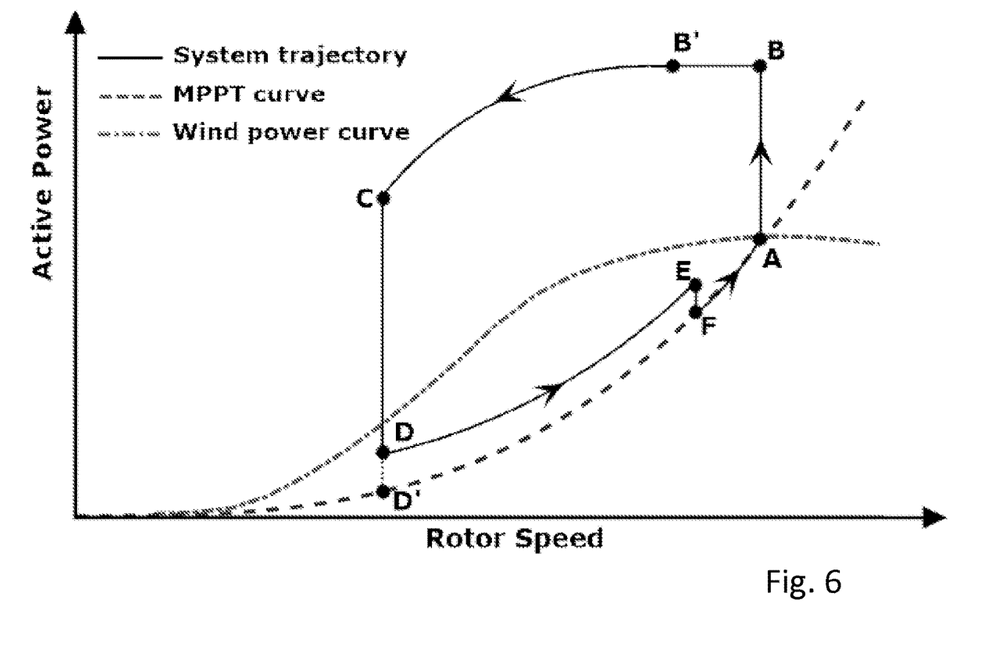
FIG. 6 shows a graph representing a schematic description of the dynamic evolution of the aerogenerator during a frequency support transient according to the present invention.

The graph of FIG. 6 shows the operation of the system according to the present invention.

In normal operating conditions, the aerogenerator works at the maximum power point for a given wind condition, which is denoted as point A and is characterized by the intersection of the dotted curve (MPPT curve) which denotes the optimal working points for the various wind speeds and the maximum of the dotted-pointed curve which represents the power extractable from the wind for a given wind speed at the varying of the rotary speed.

Whenever the integrative controller is activated, the aerogenerator will produce an increase in the power production (point B) in order to give a supporting contribution to the grid frequency. According to the law of motion, this extra production of power will cause a reduction of the rotation velocity of the aerogenerator, which will thus evolve towards the point C. Once the frequency supporting step has been completed, point C, the controller must begin to manage the speed recovery step. In the absence of a logic for managing the speed recovery, the point D would end up on the MTTP curve at point D', thus generating a very quick recovery transient, although burdensome for the frequency of the electric system. The method and system according to the present invention operates in the sense of calming the transient by locating the trajectory of the speed recovery by intermediating it at the curve which represents the power extractable from the wind and the one which represents the MPPT power values. This interposition is defined depending on the severity of the frequency transient that occurred, i.e., of the grid frequency variation value with respect to time. This point requires an estimation of the wind power and depends on the wind speed. The speed recovering step ends once the trajectory defined by the control is sufficiently close to that of the MPPT, so that the system returns back to the optimal production point again, point A, by following the traditional control curve. The application ideas are suggested in three distinct sections here below.

The invention claimed is:

1. A method of controlling, by inertia emulation, electric power generators provided with rotational inertia and connected to an electricity grid by electric power converters, the method comprising:
    measuring grid frequency and/or frequency over-time variation with respect to a rated frequency value of the electricity grid, to which an output of a generator power signal is connected;
    providing a threshold value for said grid frequency or said frequency over-time variation;
    comparing the measured grid frequency or the frequency over-time variation of the grid frequency with corresponding threshold values; and
    converting a part of a kinetic energy of a generator rotor into electric power, by decreasing rotation velocity of the generator rotor so as to provide additional supporting power to a variation of the grid frequency, whereby a total power supplied by a generator is greater than a maximum actual power corresponding to wind conditions,
    wherein:
    said additional supporting power is calculated as a function of the grid frequency and/or the frequency over-time variation and of a predetermined variable coefficient of inertia of the generator,
    said additional supporting power is supplied until said grid frequency falls within a range of preset tolerances, until the frequency over-time variation has been reduced within preset limits or said grid frequency variation is removed, or until injected power has fallen below a preset limit value, a coefficient of inertia is calculated by emulating an inertial behavior of generators consisting of synchronous machines, the coefficient of inertia of the generator is calculated as a function of rotation velocity of the generator rotor, and wherein a total power supplied by the generator during the step of converting a part of a kinetic energy is provided as a sum of maximum actual power corresponding to wind conditions, determined based on a MPPT (maximum power point tracking) control, and of the additional supporting power calculated based on the following equation:

$$P_{FS} = 2H_{synt}(\omega_r)f_e \frac{df_e}{dt} \quad (1)$$

wherein:

$$H_{synt}(\omega_r) = H_{max}\left[1 + \frac{\omega_r - \omega_{r0}}{\omega_{r0} - \omega_{r,min}}\right] \quad (2)$$

and $f_e$ is system frequency expressed in p.u.;
t is the time;
$\omega_{r,min}$ is a minimum value of rotor velocity in p.u.;
$\omega_{r0}$ is a value of the rotation velocity in p.u. of the generator rotor at a beginning of the step of converting;
$\omega_r$ is the value of the rotation velocity of the rotor in p.u.;
$H_{synt}$ is a coefficient of synthetic inertia in seconds; and
$H_{max}$ is a maximum value of the coefficient of inertia calculated for the rotation velocity of the maximum actual power corresponding to the wind conditions at the beginning of the converting step.

2. The method according to claim 1, wherein a minimum value $\omega_{r,min}$ of the rotation velocity is selected to be higher by a preset amount with respect to the rotation velocity corresponding to a cut-off of the generator rotor, in order to prevent a minimum threshold of rotation velocity from being exceeded.

3. The method according to claim 1, wherein an activation threshold of the step of converting is defined, the activation threshold providing a maximum value of a time derivative of the grid frequency in accordance with the following condition:

$$\frac{df_e}{dt} \leq ROCOF_{act} < 0 \quad (3)$$

wherein $\frac{df_e}{dt}$ is the time derivative of the grid frequency; and
$ROCOF_{act}$ is a threshold value.

4. The method according to claim 1, further comprising a step of disabling conversion of the part of the kinetic energy by no longer decreasing the rotation velocity of the generator rotor when one or both of the following conditions occurs:

the frequency over-time variation returns below a preset deactivation threshold value ($RoCoF_{deact}$); or a total power produced during the step of converting drops below a maximum actual power corresponding to the wind conditions at a time of activation of the step of converting.

5. The method according to claim 1, wherein at an end of the step of converting, a restoring step is provided to restore a delivery condition of an optimum maximum power corresponding to the wind conditions in which the electric power generator is accelerated to a rotation velocity corresponding to a generation of an optimum maximum power value, further comprising the steps of:
estimating actual available wind power; and
defining a time path for recovering rotor rotation velocity by minimizing a temporary reduction in the grid frequency due to a sudden reduction in power injected into the electric grid to increase the kinetic energy of the rotor of the electric power generator corresponding to an increase in speed needed to restore a condition of delivering the optimum maximum power value corresponding to the wind conditions, further comprising the steps of setting an acceleration of the rotor of the generator from a speed at an end of the step converting, or of a grid frequency support to rotation velocity corresponding to a generation of the optimum maximum power value for a corresponding wind condition to an extent that the generator power, for each rotation velocity at an intermediate value, is between a maximum value corresponding to wind power and a minimum value corresponding to characteristic curve describing maximum power locus as a function of wind speed, wherein the intermediate value is defined as a function of the rotation velocity based on the following equation:

$$K_{SR}(f_e) = 0.9\left(1 - \frac{f_e - f_{min}}{f_{max} - f_{min}}\right) \quad (12)$$

wherein:

$P_{SR}$ is power contribution to the electric grid during recovery of the generator's kinetic energy;
$P_{MPPT}(\omega_r)$ is a maximum optimum power corresponding to a given rotation velocity $\omega_r$ of the rotor determined by a maximum power point tracking method;
$P_s$ is the electric power produced by the generator;
$H_{WTG}$ is a coefficient of inertia of a wind generator rotor comprising an inertia of the synchronous generator;
$K_{SR}$ is an adjusting parameter of an intermediate positioning measurement of a reference power of a converter between the maximum value corresponding to the wind power and the minimum value corresponding to the characteristic curve describing the maximum power locus depending on the wind speed.

6. The method according to claim 5, wherein $K_{SR}$ is defined by the following equation:

$$K_{SR}(f_e) = 0.9\left(1 - \frac{f_e - f_{min}}{f_{max} - f_{min}}\right) \quad (12)$$

wherein:

$f_e$ is the grid frequency expressed in p.u.;

$f_{max}$ is a maximum frequency parameter in p.u. defined based on an application to a specific electricity grid; and $f_{min}$ in is a minimum frequency parameter in p.u. defined based on the application to the specific electricity grid.

7. The method according to claim 5, wherein the coefficient of inertia of the generator is calculated as a function of rotation velocity of the generator rotor.

8. A system for implementing a method according to claim 1, comprising:

a generator provided with rotational inertia and connected to an electricity grid by electric power converters;

a converter for connecting the generator to the electricity grid and comprising a conversion unit that decouples alternating current dynamics of the electricity grid from electromechanical dynamics of the generator with regard to power injected by the generator;

a control unit of said converter connecting the generator to the electricity grid, the control unit controlling the converter by generating a reference signal of an output power supplied to the electricity grid which corresponds to a maximum optimum output power of the generator for a corresponding wind condition, the control unit comprising a detector of grid frequency and/or a grid frequency over-time variation, the control unit being comprising a measuring device to measure a speed of a generator rotor; and a varying section to vary said reference signal upon generation of a generator output power for generation of an output power signal greater than the generator's maximum optimal output power for the corresponding wind condition as a function of a measured grid frequency and/or a measured frequency variation and a kinetic energy drawn from the generator's rotor which is defined as a function of an inertia value calculated as an emulation of an inertia of a synchronous machine, wherein the control unit calculates an emulated inertia value of the synchronous machine as a function of an actual rotation velocity of the generator rotor and controls a generation of more output power from the generator than the maximum optimum power for a wind condition, a greater power depending on an actual rotation velocity of the generator rotor.

9. The system according to claim 8, wherein the control unit further comprises:

a wind power detector;

a generator of a reference signal for reducing the electric power supplied by the generator to the electrical grid by an amount corresponding to an acceleration of the generator to return to an optimum working point, the reference signal depending on a value of the grid frequency between a preset maximum and minimum values and on wind power.

10. The system according to claim 8, wherein said control unit comprises a first generating section to generate a first reference signal for generating the output power of the generator corresponding to the maximum optimum power for the wind condition and an additional generating section to generate a second reference signal for generating an additional power supporting the grid frequency, the reference signal being determined as a function of an actual rotation velocity of the generator rotor, said first and second reference signals being added together in a reference signal supplied to the converter.

11. The system according to claim 8, further comprising an additional control unit for controlling generators provided with rotational inertia and connected to an electricity grid by electric power converters for supporting grid frequency with variable inertia and/or for managing a transient of rotor velocity recovery, the additional control unit comprising:

an interface for measurement signals of rotor rotation velocity;

an interface for measurement signals of the grid frequency and/or an over-time variation of said grid frequency; and a processor adapted to determine a reference signal of additional power obtainable from kinetic energy of a synchronous generator, said control unit being designed to determine, by emulating an inertia of a synchronous machine, said reference signal as a function of said grid frequency and/or said grid over-time variation and of actual rotation velocity of a generator rotor, said additional control unit being provided with an output for a reference value of said additional power, wherein said additional control unit is designed to further calculate a reference signal of power for reducing electric power supplied by the generator to the electricity grid by an amount corresponding to an acceleration of the generator to return to an optimum working point.

* * * * *